(12) United States Patent
Kim et al.

(10) Patent No.: US 8,577,388 B2
(45) Date of Patent: Nov. 5, 2013

(54) APPARATUS AND METHOD FOR DETERMINING POSITION

(75) Inventors: Kanghee Kim, Daejeon (KR); Geon Min Yeo, Daejeon (KR); Byung-Han Ryu, Daejeon (KR); Jee Hwan Ahn, Daejeon (KR); Jae Kyun Kwon, Daegu (KR); Youngsuk Suh, Daegu (KR); Kyungsu Yun, Daegu (KR); Kang-Il Ahn, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 257 days.

(21) Appl. No.: 13/122,247

(22) PCT Filed: Oct. 1, 2009

(86) PCT No.: PCT/KR2009/005642
§ 371 (c)(1),
(2), (4) Date: Apr. 1, 2011

(87) PCT Pub. No.: WO2010/038998
PCT Pub. Date: Apr. 8, 2010

(65) Prior Publication Data
US 2011/0183689 A1    Jul. 28, 2011

(30) Foreign Application Priority Data

Oct. 1, 2008 (KR) .................. 10-2008-0096694
Dec. 11, 2008 (KR) .................. 10-2008-0126110
Aug. 11, 2009 (KR) .................. 10-2009-0073942

(51) Int. Cl.
*H04W 24/00* (2009.01)

(52) U.S. Cl.
USPC ............. 455/456.1; 455/456.2; 455/456.3; 455/456.5; 455/456.6; 455/67.11

(58) Field of Classification Search
USPC ......... 455/456.1–456.6, 506, 67.11; 342/387, 342/450, 457, 458
See application file for complete search history.

(56) References Cited

U.S. PATENT DOCUMENTS 6,084,547 A * 7/2000 Sanderford et al. .......... 342/457
6,484,034 B1 * 11/2002 Tsunehara et al. ......... 455/456.6
(Continued)

FOREIGN PATENT DOCUMENTS

EP    1 942 623 A1    7/2008
GB    2349549 A  *  11/2000
(Continued)

OTHER PUBLICATIONS

JongHo Kim, et al., "The Multipath Delay Spread Model for the LOS Case", Antennas and Propagation Society International Symposium, 2008, pp. 1-4.

(Continued)

*Primary Examiner* — Olumide T Ajibade Akonai
(74) *Attorney, Agent, or Firm* — Staas & Halsey LLP (57) ABSTRACT

Provided is a wireless position determining method and apparatus. The wireless position determining includes: a measuring unit that measures a propagation delay tap of a signal received from a transmitting end through a channel; and extractor that extracts delay spread information having various forms based on the propagation delay tap; and an obtaining and calculating unit that obtains a distance between transmission and reception ends based on the delay spread information and calculates a position of a receiving end based on the obtained distance between the transmission and reception ends.

13 Claims, 3 Drawing Sheets

(56) References Cited

U.S. PATENT DOCUMENTS

| | | | |
|---|---|---|---|
| 6,671,649 B2* | 12/2003 | Kuwahara et al. | 702/150 |
| 7,151,490 B2* | 12/2006 | Richards | 342/458 |
| 2003/0036390 A1 | 2/2003 | Villier et al. | |
| 2003/0190919 A1* | 10/2003 | Niemenmaa | 455/456.1 |
| 2007/0069953 A1* | 3/2007 | Ling et al. | 342/463 |
| 2007/0072621 A1* | 3/2007 | Mukkavilli et al. | 455/456.1 |
| 2008/0158060 A1 | 7/2008 | Lee et al. | |
| 2008/0198072 A1 | 8/2008 | Elwell et al. | |
| 2008/0232649 A1* | 9/2008 | Taylor et al. | 382/117 |

FOREIGN PATENT DOCUMENTS

| | | |
|---|---|---|
| JP | 11-326484 | 11/1999 |
| KR | 2001-0046125 | 6/2001 |
| KR | 2002-0094736 | 12/2002 |
| KR | 10-2004-0041617 | 5/2004 |
| KR | 10-2008-0062202 | 7/2008 |
| WO | 03/025614 | 3/2003 |

OTHER PUBLICATIONS

"Multipath Propagation and Parameterization of Its Characteristics", Recommendation ITU-R P.1407, 1999, pp. 1-4.

Hironari Masut, et al., "Distance Dependence of Microwave Delay Spreads Measured in Urban Quasi Line-of-Sight Environments," IEICE Transactions on Communications, vol. E82-B, No. 12, p. 1997.

International Search Report issued Apr. 8, 2011 in corresponding International Patent Application PCT/KR2009/005642.

* cited by examiner

APPARATUS AND METHOD FOR DETERMINING POSITION

CROSS REFERENCE TO RELATED APPLICATIONS

This application claims the benefit of International Application No. PCT/KR2009/005642, filed Oct. 1, 2009, and claims the benefit of Korean Application No. 10-2009-0073942, filed Aug. 11, 2009, Korean Application No. 10-2008-0126110, filed Dec. 11, 2008, and Korean Application No. 10-2008-0096694, filed Oct. 1, 2008, the disclosures of all of which are incorporated herein by reference.

TECHNICAL FIELD

The present invention relates to a method and an apparatus for wirelessly determining a position. In particular, the present invention relates to a method and an apparatus for wirelessly determining a position using a delay spread.

BACKGROUND ART

A wireless position determining technology is a technology for determining a position of a terminal in a satellite navigation system such as a global positioning system (GPS), or a wireless communication system such as code division multiple access (CDMA) wireless local area network (WLAN), ultra wideband (UWB), Bluetooth, etc. Currently, the utilization of the wireless position determining technology is being expanded with the increase in demand for position information.

The GPS plays a role of an infrastructure with very high precision, but has a problem in that it does not cover every location. In detail, a first problem of the GPS is in that a GPS signal cannot be received in an area that is not visible from a satellite with regard to a line-of-sight (hereinafter referred to as "LOS"), and in particular, in most structure interiors. For example, in the case of a mobile phone, a mobile phone in which a GPS receiver is mounted uses GPS position determination with only a probability of about 25%. In order to overcome the problem, a method for retransmitting the GPS signal from the ground can be considered. In this case, since a distance from a receiving node to a terrestrial station and a distance from the receiving node to a satellite station are different from each other and the terrestrial station should be built inexpensively, a signal interference problem, a near-far problem, a synchronization problem, etc., occur. A second problem of the GPS is in that only the receiving node in which the GPS receiver is mounted can receive the GPS signal.

Therefore, wireless position determining technologies, which have degraded performance as compared to the position determining technology using the GPS but can be used in an environment where the GPS cannot be used, have been researched. Even in the environment in which the GPS cannot be used, transmitting ends and receiving ends that previously know the position are present.

In case of downlink wireless position determination, a node that wishes to know the position receives a signal from transmitting stations and uses information on the signal so that it directly performs the position determination or provides the information to a network to perform the position determination.

As a wireless position determining method other than the downlink wireless position determining method, there are an angle of arrival (AOA) method, a time of arrival (TOA) method, a time difference of arrival (TDOA) method, a received signal strength indicator (RSSI) method, etc.

The AOA method, which uses an angle of a received signal, has a problem in significantly degrading precision in the case where there is no LOS.

The RSSI method, which uses received signal strength, has a problem in causing a large error due to radio wave shadowing and fast fading.

The TOA and TDOA methods, which use a time of received signal, that is, a delay value, are relatively frequently used as compared to the AOA or RSSI method. However, the transmission signal used in the TOA and TDOA methods is spread on a time axis through a radio channel. At this time, each of the spread time delay taps has a relatively random size. For this reason, a delay tap having a dominant size can be changed every moment, such that the TOA and TDOA methods have a problem as to which time position is selected as the delay value and in degrading precision.

The above information disclosed in this. Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in effort to provide a method and an apparatus for determining a wireless position capable of improving estimation performance of position determination information of a terminal.

Solution to Problem

In order to achieve the above object, an exemplary embodiment of the present invention provides a wireless position determining method for determining position that includes: measuring a propagation delay tap of a signal received from a transmitting end through a channel by a terminal of a receiving end; extracting delay spread information having various forms based on the propagation delay tap; obtaining a distance between transmission and reception ends based on the delay spread information; and calculating the position of the receiving end based on the obtained distance between transmission and reception ends.

Another embodiment of the present invention provides a wireless position determining apparatus for determining a position that includes: a measuring unit that determines a propagation delay tap of a signal received from a transmitting end through a channel; an extractor that extracts delay spread information having various forms based on the propagation delay tap; and an obtaining and calculating unit that obtains a distance between transmission and reception ends based on the delay spread information and calculates a position of a receiving end based on the obtained distance between the transmission and reception ends.

Yet another embodiment of the present invention provides a wireless position determining method for determining position that includes: measuring a propagation delay tap of a signal received from a transmitting end through a channel by a terminal of the receiving end; extracting delay spread information having various forms based on the propagation delay tap; transmitting the delay spread information to the transmitting end; and receiving results of calculating a distance between transmission and reception ends corresponding to the delay spread information and the position of the receiving end.

Advantageous Effects of Invention

According to an embodiment of the present invention, the wireless system performs the wireless position determination using the delay spread to improve the precision of the wireless position determination, making it possible to provide more accurate wireless position determination information. Further, according to the embodiment of the present invention, the improved wireless position determination information can lead to the activation of various position-based services later.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the mobile station, the mobile terminal, the subscriber station, the portable subscriber station, the user equipment, the access terminal, etc.

Hereinafter, a wireless position determining method and apparatus according to an exemplary embodiment of the present invention will be described in detail with reference to the accompanying drawings.

First, the wireless position determining method according to an exemplary embodiment of the present invention uses delay spread of a signal that a receiving end receives from a transmitting end through a channel. Herein, the delay spread means a delay time between a first radio wave received via different paths in a multipath environment of a radio wave and a received radio wave reflected from another path. At this time, a position of any one of the receiving end and the transmitting end is previously known and generally fixed. Therefore, a position of the other of them becomes an object of the position determination.

The wireless position determining method may include a downlink position determining method and an uplink position determining method.

The downlink position determination determines the position of the receiving end and the uplink position determining method determines the position of the transmitting end. The uplink position determining method and the downlink position determination method are similar to each other in terms of obtaining the delay spread information or calculating the position.

In detail, in the case of the downlink position determination, a terminal of the receiving end, which is an object of the position determination, obtains the delay spread information so that it directly calculates the position or provides information to a network of the transmitting end to calculate the position.

In the case of the uplink position determining method, the terminal of the receiving end obtains the delay spread information from the terminal of the transmitting end that is an object of the position determination so that a network of the receiving end directly calculates the position or provides the information to the terminal of the transmitting end to calculate the position.

Although the wireless position determining method and apparatus according to the exemplary embodiment of the present invention are applied to both the downlink position determination and the uplink position determination, the downlink position determination will be described herein. However, the present invention is not limited thereto.

Generally, an impulse response of the channel of the receiving end from each terminal of the transmitting end whose position is known to the terminal of the receiving end that is an object of the position determination is changed to have a spread shape over time.

The method for determining the position using time of arrival of a radio wave has a problem as to which time position is considered as the time of arrival of a radio wave in the received signal having the delay spread. For this reason, the method has a limitation of accurately determining the position using the time of arrival of the radio wave. Herein, the time of arrival of the radio wave may be one of the position of the delay tap having the strongest received strength and the position of the delay tap that exceeds a threshold value and arrives earliest.

The wireless position determining method according to the exemplary embodiment of the present invention uses distance estimation between the transmitting end and the receiving end (hereinafter referred to as "between transmission and reception ends") using the delay spread of the radio wave.

Next, the propagation delay corresponding to the distance between the transmission and reception ends will be described with reference to FIGS. 1 and 2.

Figure 1:
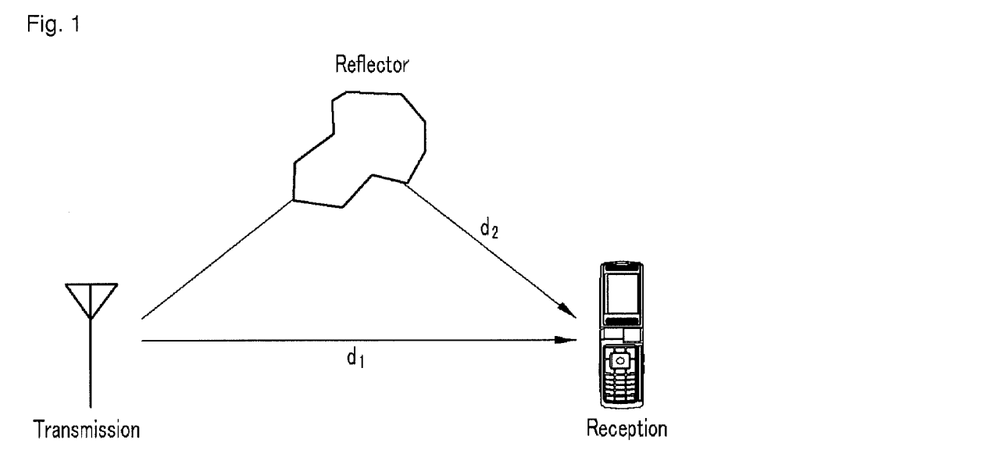
FIGS. 1 and 2 are diagrams showing a propagation delay corresponding to a distance between transmission and reception ends according to an exemplary embodiment of the present invention.
Figure 2:
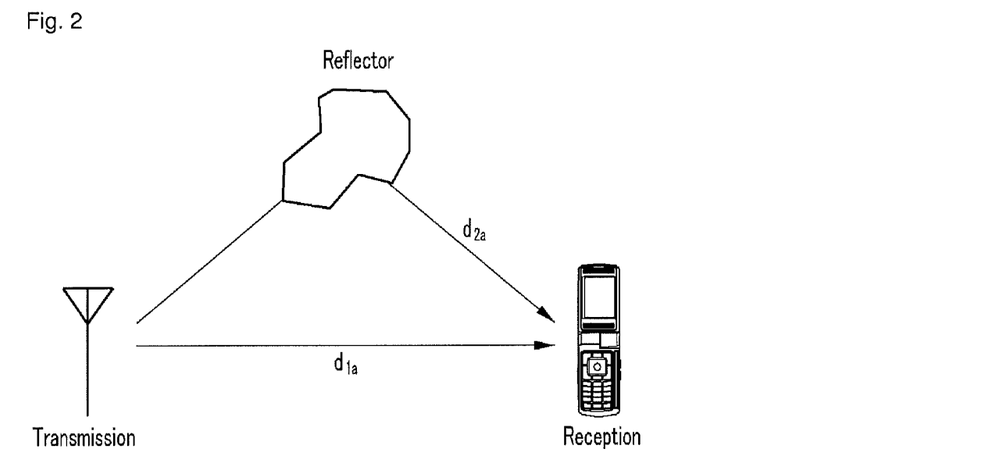

FIGS. 1 and 2 are diagrams showing a propagation delay corresponding to a distance between transmission and reception ends according to an exemplary embodiment of the present invention.

Referring to FIGS. 1 and 2, if the distance between the transmission and reception ends increases, each delay tap time is proportional to a distance such that the delay time difference increases in proportion to the distance difference.

In detail, if the distance doubles, $$d_{2a} - d_{1a} = 2(d_2 - d_1).$$

As a result, the delay time difference doubles and the delay spread increases. However, in FIGS. 1 and 2, since a relative receiving power ratio of two propagation paths is proportional to a path attenuation coefficient (μ) of two distances, $$\left(\frac{d_{2a}}{d_{1a}}\right)^\mu = \left(\frac{d_2}{d_1}\right)^\mu$$

such that it is not changed. The path attenuation coefficient (μ) is a real part of a propagation coefficient that indicates a degree of attenuation of signal power in the propagation path.

As such, the distribution of the propagation delay taps is expanded and reduced on a time axis in proportion to the distance between the transmission and reception ends. The distance information between the transmission and reception ends can be obtained based on the distribution of the propagation delay taps.

In other words, the distance information between the transmission and reception ends can be calculated based on the distribution of the propagation delay taps. Meanwhile, upon calculating the distance information, whether or not a message flow for transmitting information between the transmission and reception ends is needed depends on what the calculation subject is.

In the case of the downlink position determination, when the terminal of the receiving end to be measured directly performs the position calculation from the received signal, information other than the final position information is no longer transmitted. Even the transmission of the final position information may not be needed. However, for complex and precision calculation, if the position calculation is performed in the network, the terminal of the receiving end should transmit the information on the whole distribution of propagation delay taps or the simplified delay spread to the network.

Next, a wireless position determining apparatus will be described in detail with reference to FIG. 3.

Figure 3:
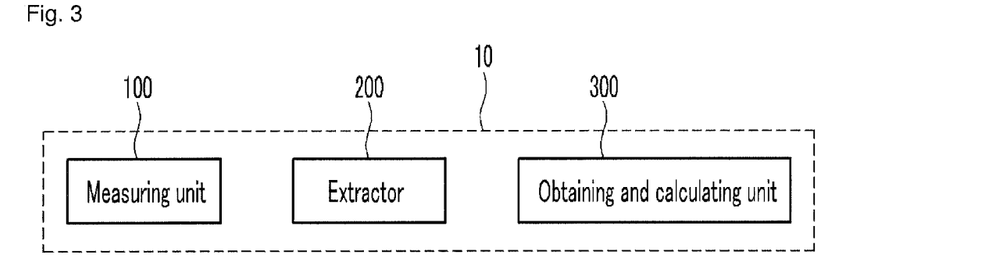
FIG. 3 is a diagram showing a wireless position determining apparatus according to an exemplary embodiment of the present invention.

FIG. 3 is a diagram showing a wireless position determining apparatus according to an exemplary embodiment of the present invention.

First, a wireless position determining apparatus 10 according to an exemplary embodiment of the present invention is the terminal of the receiving end using the downlink position determining method.

The downlink position determining method is a method that allows the terminal of the receiving end, which is an object of the position determination, to obtain the delay spread information, and the receiving end directly calculates the position or provides the information to the network of the transmitting end to calculate the position. Herein, the wireless position determination apparatus 10 is a terminal that is positioned at the receiving end and determines the position of the receiving end.

Referring to FIG. 3, the wireless position determining apparatus 10 includes a measuring unit 100, an extractor 200, and an obtaining and calculating unit 300.

The measuring unit 100 measures the propagation delay tap. Herein, the distribution of propagation delay taps is expanded and reduced on the time basis in proportion to the distance between the transmission and reception ends.

The extractor 200 extracts the delay spread information based on the measured propagation delay tap.

In detail, the extractor 200 extracts the delay spread information having various forms in order to obtain the distance between the transmission and reception ends from the distribution of the propagation delay taps. At this time, various forms include a first measurement to a third measurement as will be described below.

(1) The first measurement is a difference between a minimum delay value and a maximum delay value among the propagation delay taps of which receiving power is higher than a noise power level and is a threshold value or more, the threshold value determined in consideration of average received signal strength.

(2) The second measurement is a weighted root mean square (weighted RMS) of absolute delay value of the delay taps. The second measurement is calculated based on the absolute time of the delay taps, which includes a limited condition that the receiving end should know the absolute time of the transmitting end, similar to the TOA environment.

(3) The third measurement is a relative weighted standard deviation of the delay taps.

The plurality of measurements are equivalent to Equations 1 to 3 when the delay taps are $$t_1, t_2, t_3, \ldots$$

and the receiving powers of each delay tap are $$p_1, p_2, p_3, \ldots$$

First measure=

$$\max\{(t_i-t_j) | t_i \geq t_j,\ p_i \geq p_n,\ p_j \geq p_n,\ p_i \geq p_{th},\ p_j \geq p_{th}\} \quad \text{(Equation 1)}$$

Herein, $$p_{n, pth}$$

are respectively the noise power level and the threshold value.

$$\text{Second measure} = \sqrt{\frac{\sum_i p_i t_i^2}{\sum_i p_i}} \quad \text{(Equation 2)}$$

$$\text{Third measure} = \sqrt{\frac{\sum_i p_i (t_i - m)^2}{\sum_i p_i}} = \sqrt{\frac{\sum_i p_i t_i^2}{\sum_i p_i} - \left(\frac{\sum_i p_i t_i}{\sum_i p_i}\right)^2} \quad \text{(Equation 3)}$$

Herein, m is a weight value average of the delay tap times.

When extracting the delay spread information having various forms, the second measure needs the absolute time value and the first measure and the third measure can be extracted if there is a relative time value to each other of $$t_i$$

In other words, for the second measurement the receiving end should know the absolute times of each transmitting end, but the first measurement and the third measurement have advantages in that the transmitting end and the receiving end do not need to know times for each other and the terminals of the transmitting end do not need to synchronize with each other.

The delay spread information extracted from the extractor 200 includes the information elements (IE). The IE has a form of {tap time stamp, tap value}, matrix, or vector. The tap time stamp is the time information of the channel at which effective power is sensed when measuring the propagation delay tap of the channel, and represents the time information of the channel as a relative or absolute value. The tap value is a measured power value corresponding to the corresponding tap time stamp, and can represent the measured power values as the relative or absolute power. Herein, the measured power value can alternatively be represented as a amplitude instead of the power. Further, the IE can be reported in a form such as the weighted root mean square processing the corresponding information, the weight standard deviation, a delay width, an average, etc., in addition to the {tap time stamp, tap value}. The processing form of information can use all the methods using the basic information of the present invention.

The obtaining and calculating unit 300 obtains the distance between the transmission and reception ends based on the delay spread information having various forms, and calculates the position of the receiving end based on the obtained distance between the transmission and reception ends. At this time, the distance between the transmission and reception ends can be changed according to the overall channel environments, such as a carrier frequency, the kind of communication system, a communication region, weather, etc.

The obtaining and calculating unit 300 builds an approximate equation or a database through the channel measurement, and obtains the distance between the transmission and reception ends based on the approximate equation or the database. Herein, in the existing channel model, the time difference of the delay tap is generally fixed regardless of the distance between the transmission and reception ends. For this reason, the method of using the channel model as it is, which is mainly used in the related art, is inappropriate.

The channel model provides an average delay tap in consideration of the position within a cell. For example, in the case of an ITU-R Pedestrian A channel model, four delay taps exist throughout 0 ns to 410 ns, and the average receiving power for each delay tap is defined as 0 dB to −22.8 dB.

It is difficult for the obtaining and calculating unit 300 to build the database through the channel measurement. For this reason, the existing channel model is used, but the position of the delay tap of the channel model can linearly increase according to the distance between the transmission and reception ends. At this time, if the distance between the transmission and reception ends increases, all the delay tap times increase at the same ratio.

Next, a method for calculating position based on the downlink position determination method will be described in detail with reference to FIGS. 4 and 5. Herein, the downlink position determining method is a method that directly calculates the position by the terminal of the receiving end, or provides the information to the network of the transmitting end to perform the position determination.

Figure 4:
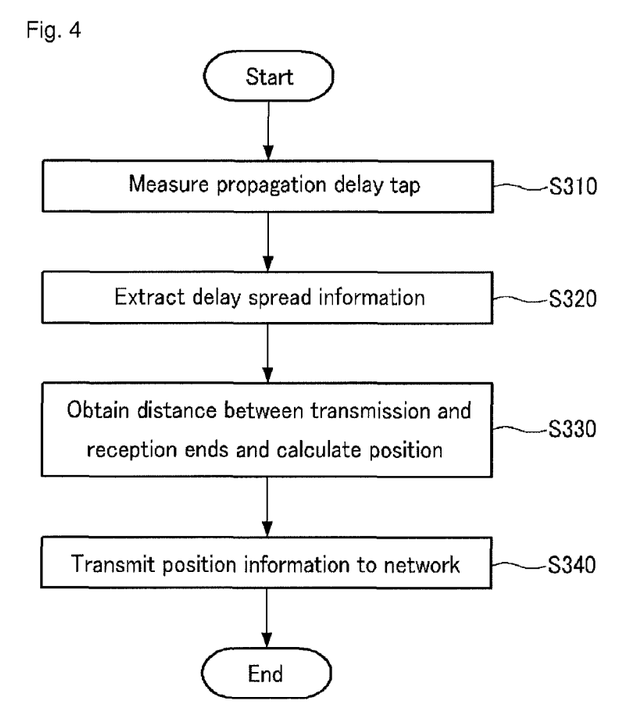
FIG. 4 is a flowchart showing a method for calculating position by a receiving end terminal in downlink position determination according to an exemplary embodiment of the present invention.

FIG. 4 is a flowchart showing a method for calculating position by a receiving end terminal in downlink position determination according to an exemplary embodiment of the present invention.

First, the wireless position determining apparatus 10 according to the exemplary embodiment of the present invention is the terminal using the downlink position determining method. Herein, the wireless position determining apparatus 10 is positioned at the receiving end to measure the position of the receiving end.

Referring to FIG. 4, the wireless position determining apparatus 10 measures the propagation delay tap of the signal received from the transmitting end through the channel (S310). Herein, the distribution of the radio wave taps is expanded or reduced on the time basis in proportion to the distance between the transmission and reception ends.

The wireless position determining apparatus 10 extracts the delay spread information having various forms based on the measured propagation delay tap (S320).

Next, the wireless position determining apparatus 10 obtains the distance between the transmission and reception ends based on the extracted delay spread information, and calculates the position of the receiving end based on the obtained distance between the transmission and reception ends (S330).

The wireless position determining apparatus 10 transmits the position information, which is information corresponding to the calculated position of the receiving end, to the network, if necessary (S340).

Next, the method for calculating the position in the downlink position determination by the network will be described in detail with reference to FIG. 5.

Figure 5:
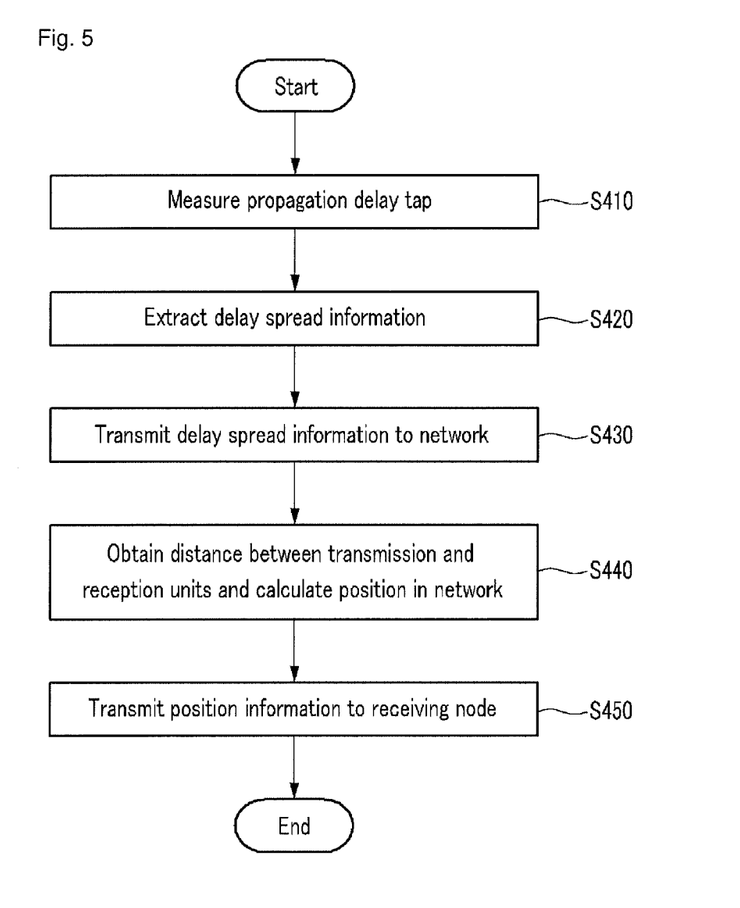
FIG. 5 is a flowchart showing a method for calculating position by a network in downlink position determination according to an exemplary embodiment of the present invention.

FIG. 5 is a flowchart showing a method for calculating position by a network in downlink position determination according to an exemplary embodiment of the present invention.

Referring to FIG. 5, the wireless position determining apparatus 10 measures the propagation delay tap of the signal received from the transmitting end through the channel (S410). Herein, the distribution of the propagation delay tap is expanded or reduced on the time basis in proportion to the distance between the transmission and reception ends.

The wireless position determining apparatus 10 extracts the delay spread information having various forms based on the measured propagation delay tap (S420). Next, the wireless position determining apparatus 10 transmits the extracted delay spread information to the transmitting end network (S430).

The corresponding device of the network of the transmitting end that performs the same function as the obtaining and calculating unit 300 included in the wireless position determining apparatus 10 obtains the distance between the transmission and reception ends based on the received delay spread information, and calculates the position of the receiving end based on the obtained distance between the transmission and reception ends (S440).

The wireless position determining apparatus 10 receives the position information, which is information corresponding to the position of the receiving end, through the network of the transmitting end, if necessary (S450).

The wireless position determining method and apparatus according to the exemplary embodiment of the present invention can be applied to a wireless network where it is necessary to perform wireless position determination, such as a cellular mobile communication system, a sensor network, etc., but is not limited thereto.

The wireless position determining method and apparatus according to the exemplary embodiment of the present invention use the delay spread to perform the wireless position determination, making it possible to improve precision of the wireless position determination. Further, the wireless position determining performance can be improved by combining the wireless position determining method using the delay spread and the wireless position determining method of the related art.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A wireless position determining method for determining a position, comprising:
   measuring a propagation delay tap of a signal received from a transmitting end through a channel by a terminal of a receiving end;
   extracting delay time spread information having various forms based on the propagation delay tap;
   obtaining a distance between transmission and reception ends based on the delay spread information; and
   calculating the position of the receiving end based on the obtained distance between transmission and reception ends.

2. The wireless position determining method of claim 1, wherein the distribution of the propagation delay taps is expanded or reduced on a time basis in proportion to the distance between the transmission and reception ends.

3. The wireless position determining method of claim 1, wherein the obtaining the distance between the transmission and reception ends comprises:
   building an approximate equation or a database through a measurement of the channel used at the time of measuring the propagation delay tap; and
   obtaining the distance between the transmission and reception ends based on the approximate equation or the database.

4. The wireless position determining method of claim 1, further comprising transmitting the information including the calculated position of the receiving end to the transmitting end.

5. A wireless position determining apparatus for determining a position, comprising:
   a measuring unit that measures a propagation delay tap of a signal received from a transmitting end through a channel;
   an extractor that extracts delay time spread information having various forms based on the propagation delay tap; and
   an obtaining and calculating unit that obtains a distance between transmission and reception ends based on the delay spread information and calculates a position of a receiving end based on the obtained distance between the transmission and reception ends.

6. A wireless position determining apparatus for determining a position, comprising:
   a measuring unit that measures a propagation delay tap of a signal received from a transmitting end through a channel;
   an extractor that extracts delay spread information having various forms based on the propagation delay tap; and
   an obtaining and calculating unit that obtains a distance between transmission and reception ends based on the delay spread information and calculates a position of a receiving end based on the obtained distance between the transmission and reception ends,
   wherein the delay spread information having various forms corresponds to one of a measurement which is a difference between a minimum delay value and a maximum delay value among the propagation delay taps of which receiving power is higher than a noise power level and is a threshold value or more, a measurement which is a weighted root mean square of absolute delay values of the propagation delay taps, and a measurement which is a relative weighted standard deviation of the delay values of the propagation delay taps.

7. The wireless position determining apparatus of claim 5, wherein the distribution of the propagation delay taps is expanded or reduced on a time basis in proportion to the distance between the transmission and reception ends.

8. A wireless position determining method for determining a position of a receiving end, comprising:
   measuring a propagation delay tap of a signal received from a transmitting end through a channel by a terminal of the receiving end;
   extracting delay time spread information having various forms based on the propagation delay tap;
   transmitting the delay spread information to the transmitting end; and
   receiving results of calculating a distance between transmission and reception ends corresponding to the delay spread information and the position of the receiving end.

9. The wireless position determining method of claim 8, wherein the distribution of the propagation delay taps is expanded or reduced on a time basis in proportion to the distance between the transmission and reception ends.

10. A wireless position determining method for determining a position of a receiving end, comprising:
    measuring a propagation delay tap of a signal received from a transmitting end through a channel by a terminal of the receiving end;
    extracting delay spread information having various forms based on the propagation delay tap;
    transmitting the delay spread information to the transmitting end; and
    receiving results of calculating a distance between transmission and reception ends corresponding to the delay spread information and the position of the receiving end,
    wherein the delay spread information having various forms corresponds to one of a measurement which is a difference between a minimum delay value and a maximum delay value among the propagation delay taps of which receiving power is higher than a noise power level and is a threshold value or more, a measurement which is a weighted root mean square of absolute delay values of the propagation delay taps, and a measurement which is a relative weighted standard deviation of the delay values of the propagation delay taps.

11. The wireless position determining method of claim 8, wherein the receiving comprises:
    obtaining the distance between the transmission and reception ends in the transmitting end based on the delay spread information;
    calculating the position of the receiving end based on the distance between the transmission and reception ends; and
    transmitting the calculated position of the receiving end and the distance between the transmission and reception ends to a terminal of the receiving end.

12. The wireless position determining method of claim 1, wherein the delay time spread information is based on a minimum delay value and a maximum delay value among the propagation delay taps, absolute delay values of the propagation delay taps, and delay values of the propagation delay taps.

13. The wireless position determining apparatus of claim 8, wherein the delay time spread information is based on a minimum delay value and a maximum delay value among the propagation delay taps, absolute delay values of the propagation delay taps, and delay values of the propagation delay taps.

\* \* \* \* \*